United States Patent
D'Souza et al.

(10) Patent No.: US 11,772,828 B2
(45) Date of Patent: Oct. 3, 2023

(54) AEROSPACE VEHICLE ENTRY FLIGHTPATH CONTROL

(71) Applicant: United States of America as Represented by the Administrator of NASA, Washington, DC (US)

(72) Inventors: Sarah Nicole D'Souza, Sacramento, CA (US); Wendy Awele Okolo, Mountain View, CA (US); Benjamin William Look Margolis, Oakland, CA (US); Ben Edward Nikaido, Gilroy, CA (US); Bryan Yount, Sunnyvale, CA (US); Breanna Jermille Johnson, League City, TX (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 191 days.

(21) Appl. No.: 17/348,760

(22) Filed: Jun. 15, 2021

(65) Prior Publication Data
US 2021/0387753 A1    Dec. 16, 2021

Related U.S. Application Data

(60) Provisional application No. 63/039,453, filed on Jun. 15, 2020.

(51) Int. Cl.
*B64G 1/24* (2006.01)
*B64G 1/62* (2006.01)
*B64G 1/26* (2006.01)

(52) U.S. Cl.
CPC .............. *B64G 1/244* (2019.05); *B64G 1/26* (2013.01); *B64G 1/62* (2013.01)

(58) Field of Classification Search
CPC . B64G 1/244; B64G 1/62; B64G 1/58; B64G 1/26; B64G 1/242; B64G 1/22;
(Continued)

(56) References Cited

U.S. PATENT DOCUMENTS 5,050,086 A * 9/1991 Lambregts ............. G05D 1/085
   701/4
6,502,785 B1 * 1/2003 Teter ....................... F42B 10/64
   244/3.28

(Continued)

*Primary Examiner* — Khoi H Tran
*Assistant Examiner* — Tanner L Cullen
(74) *Attorney, Agent, or Firm* — Rhys W. Cheung; Robert M. Padilla; Trenton J. Roche

(57) ABSTRACT

A system for controlling an aerospace vehicle by exploiting the dihedral effect to control bank angle of the vehicle by modulating sideslip. The control system includes a closed feedback loop comprising an outer loop for producing a sideslip angle command to induce a roll moment through the dihedral effect to satisfy a bank angle command, and an inner loop for taking the sideslip angle command, and possibly an angle of attack command to produce control input for flightpath hardware controls. Flightpath control hardware include pairs of flaps arranged longitudinally along the leading and trailing edges of an aeroshell of an aerospace entry vehicle to control pitch for changing the angle of attack, and another pair of flaps arranged laterally to control yaw for changing the bank angle via the sideslip angle, and also moving mass along ribs to control pitch and yaw. Thrusters can be fired to induce roll.

17 Claims, 14 Drawing Sheets

(58) Field of Classification Search
CPC .... B64G 1/16; B64G 1/401; B64G 2001/245;
G05D 1/0808; G05D 1/0825; G05D
1/0816; G05D 1/085; G05D 1/0833;
G05D 1/101; B64C 15/00; B60W
2520/20; B60W 2720/20
See application file for complete search history.

(56) References Cited

U.S. PATENT DOCUMENTS

| | | | | |
|---|---|---|---|---|
| 8,026,465 | B1 * | 9/2011 | Fraysse, Jr. ............. | F42B 10/54 |
| | | | | 244/3.22 |
| 8,321,077 | B1 * | 11/2012 | Garcia-Llama ........ | B64G 1/244 |
| | | | | 701/13 |
| 2014/0319267 | A1 * | 10/2014 | Paranjape ................. | B64C 3/42 |
| | | | | 244/47 |

* cited by examiner

AEROSPACE VEHICLE ENTRY FLIGHTPATH CONTROL

CLAIM OF PRIORITY

The present application claims priority to U.S. Provisional Patent Application No. 63/039,453, entitled "Aerospace Vehicle Entry Flightpath Control," filed Jun. 15, 2020, the entire disclosure of which is hereby incorporated by reference for all purposes in its entirety as if fully set forth herein.

ORIGIN OF THE INVENTION

The invention described herein was made in the performance of work under a NASA contract and by (an) employee(s) of the United States Government and is subject to the provisions of Public Law 96-517 (35 U.S.C. § 202) and may be manufactured and used by or for the Government for governmental purposes without the payment of any royalties thereon or therefor. In accordance with 35 U.S.C. § 202, the contractor has elected not to retain title.

FIELD OF THE INVENTION

Embodiments of the invention generally relate to guidance and control systems, and in particular, guidance and control systems for aerospace entry vehicles.

BACKGROUND

Many state-of-the-art hypersonic atmospheric entry vehicles return to Earth unguided, elevating the cost and risk of vehicle recovery and limiting the types of payloads that can be flown. The need for precision landing of high mass payloads on Mars or returning sensitive samples from other planetary bodies to specific locations on Earth is driving the development of an innovative NASA technology called a Deployable Entry Vehicle (DEV), capable of being folded and stowed. Traditional entry vehicles for high mass missions do not scale well for launch vehicles currently available, driving the need for a solution that is foldable and deployable for entry. A DEV has the potential to deliver an equivalent science payload with a stowed diameter 3 to 4 times smaller than a rigid aeroshell.

The primary design challenge for either mechanically deployed DEVs or inflatable DEVs is the integration of a guidance and control system on a vehicle with no back shell, while ensuring that the system meets precision targeting requirements. Traditional entry systems rely on small reaction control thrusters mounted on the back shell for guidance and control (G&C). These thrusters are installed at locations that provide adequate control authority and sufficient distance between the thruster exhaust and sensitive areas on the vehicle. In contrast, DEVs have no back shell. It would be desirable to have a G&C system for a DEV that can feasibly integrate with the structure while meeting packaging and precision targeting requirements.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1A:
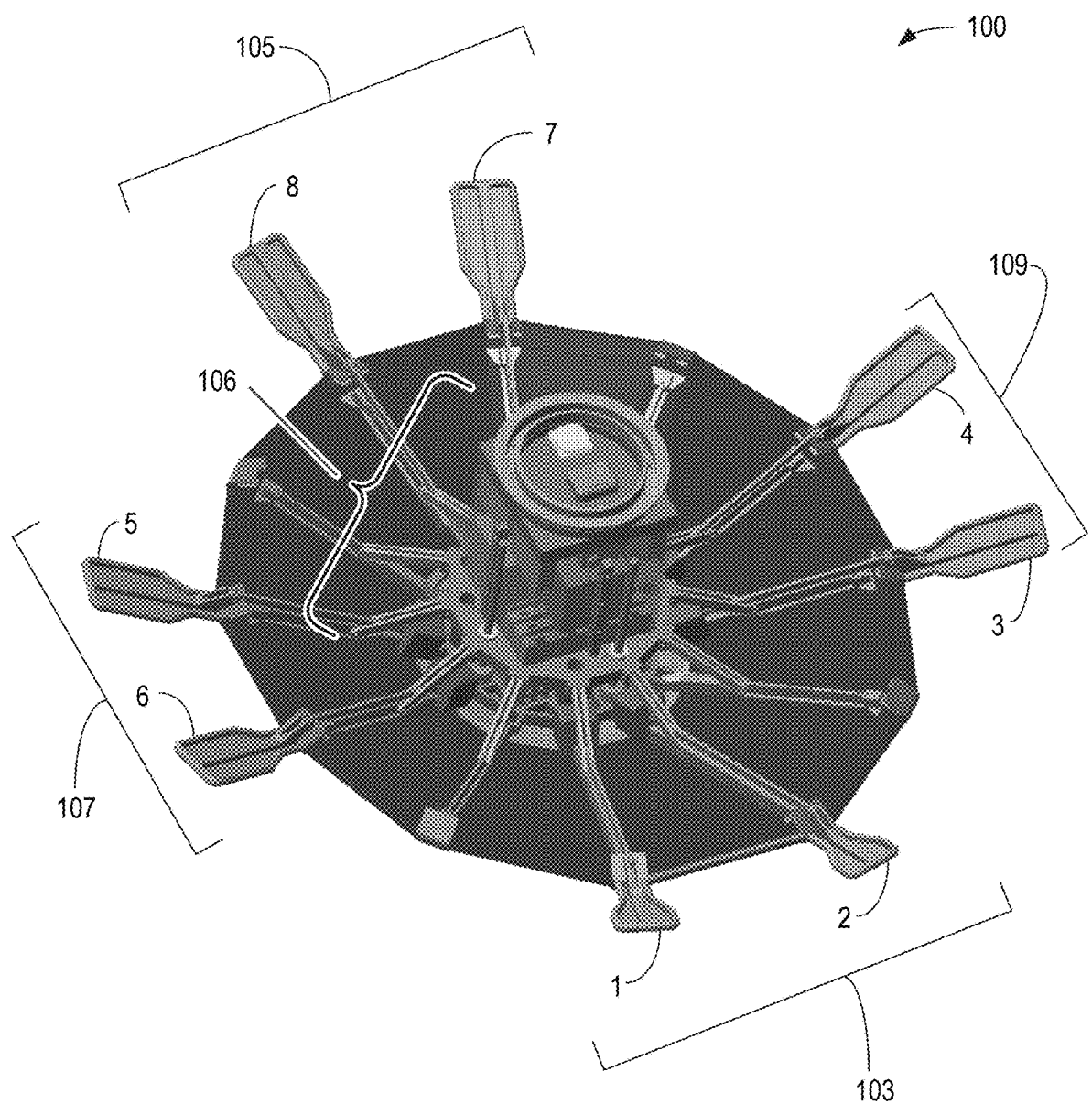
FIG. 1a is an illustration of an aft perspective view of an example of a deployable entry vehicle with a flap-based non-propulsive control system, according to some embodiments.

Approaches for a flightpath control system to provide vehicle stabilization, steering, and precise targeted landing of an atmospheric entry vehicle are presented herein. Embodiments also provide for a control architecture that can be used with any aerospace vehicle with a strong dihedral effect. In the following description, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

Embodiments of the invention involve aerospace vehicles, especially any aerospace vehicle with a strong dihedral effect, and in some embodiments, atmospheric entry vehicles. Non-limiting, illustrative examples of aerospace vehicles include aircraft having wing dihedral; spacecraft exhibiting a strong dihedral effect in launch, orbital or sub-orbital flight, atmospheric entry, or atmospheric flight; and deployable blunt-body entry vehicles, including an asymmetric deployable entry vehicle (DEV) called Adaptable, Deployable, Entry, and Placement Technology (ADEPT) vehicle, and in particular a Lifting Nano-ADEPT (LNA).

The LNA entry system with various flightpath control hardware configurations are described herein. According to some embodiments, the LNA entry system includes flightpath control hardware comprising flaps in a flap-based non-propulsive control system having (i) a deployable rib structure, (ii) a 3-D woven carbon fabric with high temperature capability that is stretched over the rib structure to form the entry body aeroshell to act as both the aeroshell structure and thermal protection system, and (iii) a flap configuration with longitudinal flaps for independent pitch control, and lateral flaps generating yaw moments. The flaps, which are mounted to the shoulder of the LNA entry system's heatshield, are commanded and controlled to rotate into or out of the flow coming off the heatshield. Actively changing flap deflection angles creates changes in the vehicle's aerodynamics and allows the entry vehicle to be maneuvered without the use of thrusters.

According to some embodiments, the LNA entry system includes flightpath control hardware comprising moving masses in a mass movement system mounted to a Deployable Entry Vehicle (DEV) that uses Center of Mass (CoM) shifting to provide entry flightpath control. Moveable ballast masses are mounted to several ribs of the DEV heatshield allowing the vehicle's CoM to be shifted away from the vehicle's centerline. Shifting the vehicle's CoM is used to generate lift, sideslip, or both, by changing pitch or yaw respectively to control the vehicle's flightpath.

Using aerodynamic forces or CoM shifting to maneuver an entry vehicle may reduce propellant mass requirements and result in a net mass savings for the vehicle. These mass savings could potentially be used to increase the payload mass available for NASA missions of this type.

According to some embodiments, the LNA entry system includes flightpath control hardware comprising thrusters in a Reaction Control System (RCS) mounted to the articulating structure of the LNA entry vehicle to provide entry flightpath control. RCS thrusters are mounted to four ribs of the open-back DEV heatshield structure to provide efficient bank angle control of the vehicle through producing changes in the vehicle's roll. Combining rib-mounted RCS thrusters with a DEV is expected to provide greater downmass capability than a rigid capsule sized for the same launch vehicle. The innovation is expected increase the downmass capability for NASA missions where launch vehicle payload envelope is a limiting factor.

Vehicle Overview

FIG. 1a is an illustration of an aft perspective view of an example of a deployable entry vehicle, LNA vehicle 100, with a flap-based non-propulsive control system, according to some embodiments. LNA vehicle 100 employs ribs 101 of unequal lengths to form a raked-conic shape that generates lift. When deployed and opened, LNA vehicle 100 has a one meter (39.4 in) nominal diameter, 70 degree cone angle, twelve ribs 101, and an open back aeroshell. Asymmetry for lift generation comes from longer ribs (and fabric) on what becomes the trailing edge side of the vehicle. The trailing edge side ribs of the vehicle is approximately 16% longer than the vehicle's ribs on leading edge 105. A volume 106 equivalent to 12 U cubesats (20 cm×20 cm×30 cm) is provided for combined payload and vehicle subsystems, which includes capacity for the equivalent of two cubesats of true payload. The baseline total entry mass is 59.4 kg before entry control systems, including control surfaces such as flaps, and associated mounting and actuation hardware, are added.

LNA vehicle 100 includes four longitudinal flaps, flaps 1 and 2 on trailing edge 103 and flaps 7 and 8 on leading edge 105 for independent pitch control. Four lateral flaps 5, 6 on port side 107 and flaps 4, 3 on starboard side 109 are for generating yaw moments. In some embodiments, flaps 1 and 2 on trailing edge the long ribs are smaller due to overall length constraints for stowing.

Figure 1B:
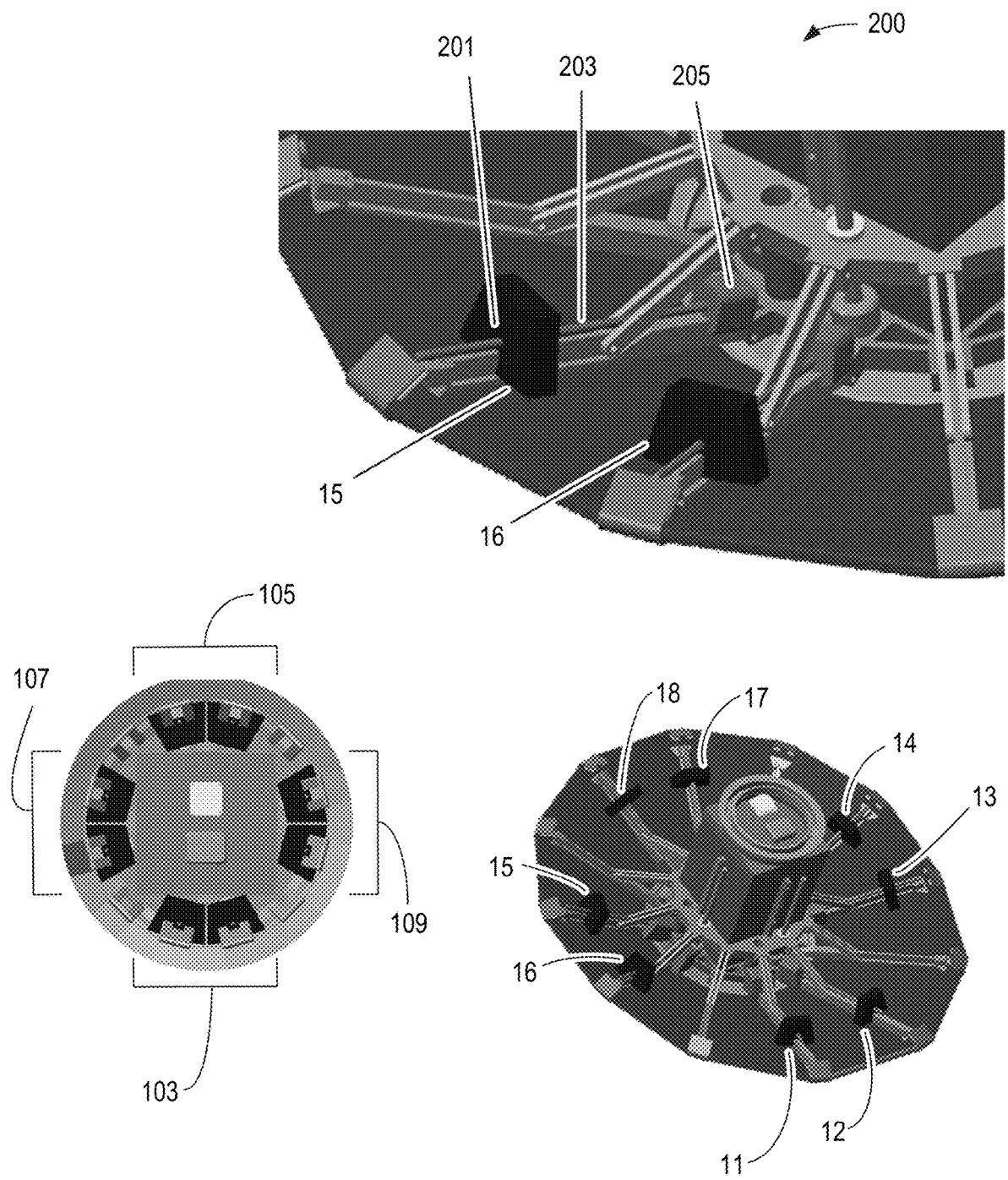
FIG. 1b is an illustration of an aft perspective view of an example of a deployable entry vehicle with a mass movement non-propulsive control system, according to some embodiments.

FIG. 1b includes an illustration of an aft perspective view of an example of a deployable entry vehicle, LNA vehicle 200, configured with a mass movement non-propulsive control system mounted on the same base LNA vehicle as in FIG. 1a, according to some embodiments. FIG. 1b further includes an aft view of the LNA vehicle 200 in a stowed position. LNA vehicle 200 includes four longitudinal moving masses 11, 12, 17, 18 with two masses 11, 12 mounted to ribs of the trailing edge 103 and two masses 17, 18 mounted to ribs of the leading edge 105 for independent pitch control. LNA vehicle 200 further includes four lateral moving masses 13, 14, 15, 16, two masses 15, 16 mounted to the ribs of port side 107 and two masses 13, 14 mounted to the ribs of the starboard side 109 for independent yaw control. The masses include threaded hole 201 for receiving actuator lead screw 203 that is rotated by actuator motor 205 to generate linear movement of the mounted masses.

Figure 1C:
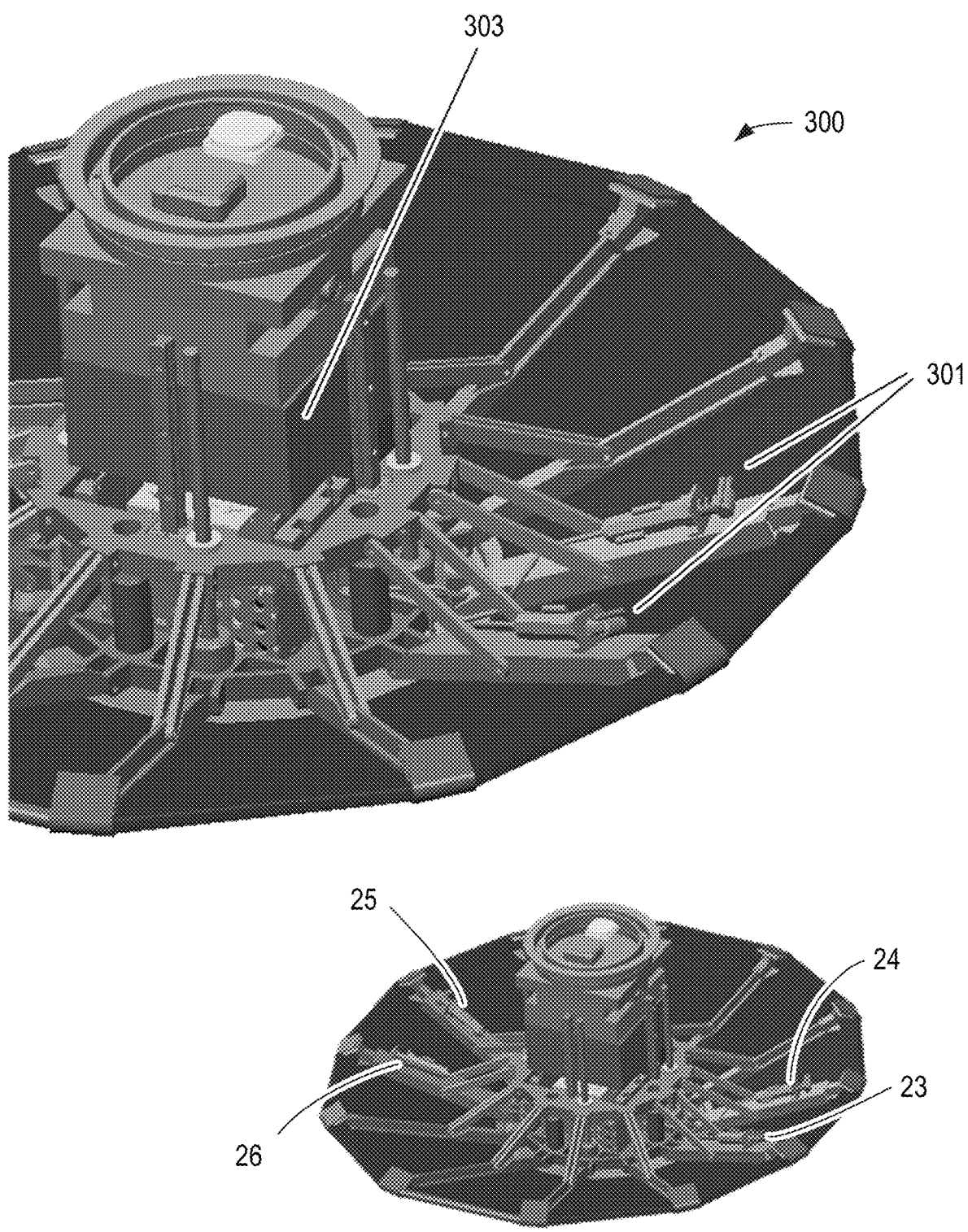
FIG. 1c is an illustration of an aft perspective view of an example of a deployable entry vehicle with a rib-based reaction control system, according to some embodiments.

FIG. 1c is an illustration of an aft perspective view of an example of a deployable entry vehicle, LNA vehicle 300, configured with a Reaction Control System (RCS) mounted on the same base LNA vehicle as in FIG. 1a, according to some embodiments. LNA vehicle 300 includes four rib-mounted thrusters 301, and an RCS fuel tank and controller module 303 contained in the payload area. As shown, two pairs of thrusters are mounted on lateral ribs of the vehicle, with thrusters 23, 24 mounted on the starboard side of the vehicle, and thrusters 25, 26 mounted on the port side.

Some embodiments are described herein with respect to a flap-based non-propulsive control system. Other embodiments employ a moving mass. While the masses in a mass-movement non-propulsive control system are placed on the same ribs as the flaps in a flap-based non-propulsive control system, the control authority differs between all three control systems. Additionally, the control system architecture described in below is generally applicable to all three control systems (FIG. 1a.-FIG. 1c).

Figure 2:
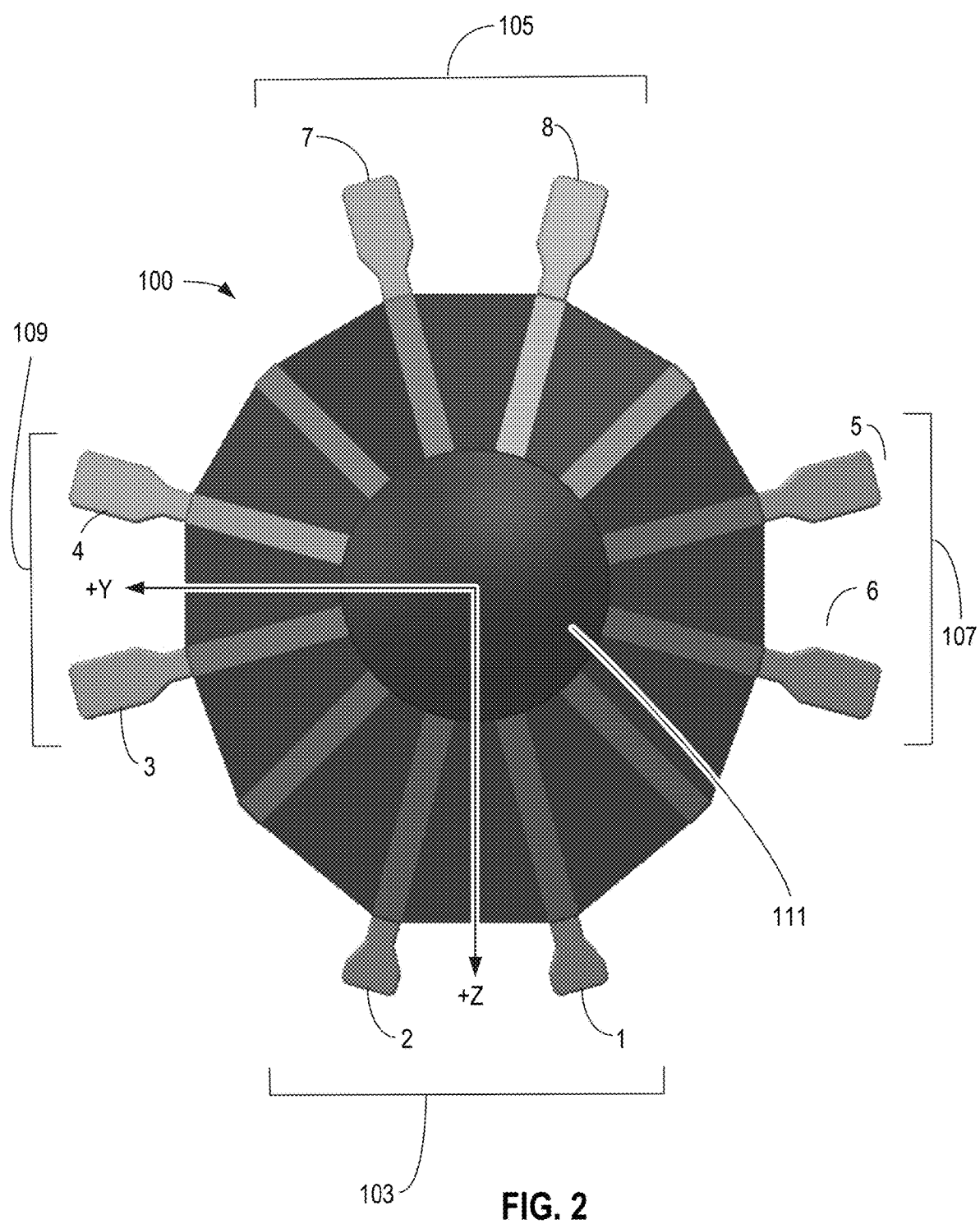
FIG. 2 is an illustration of a windward view of an example of a deployable entry vehicle with a flap-based non-propulsive control system, according to some embodiments.
Figure 3:
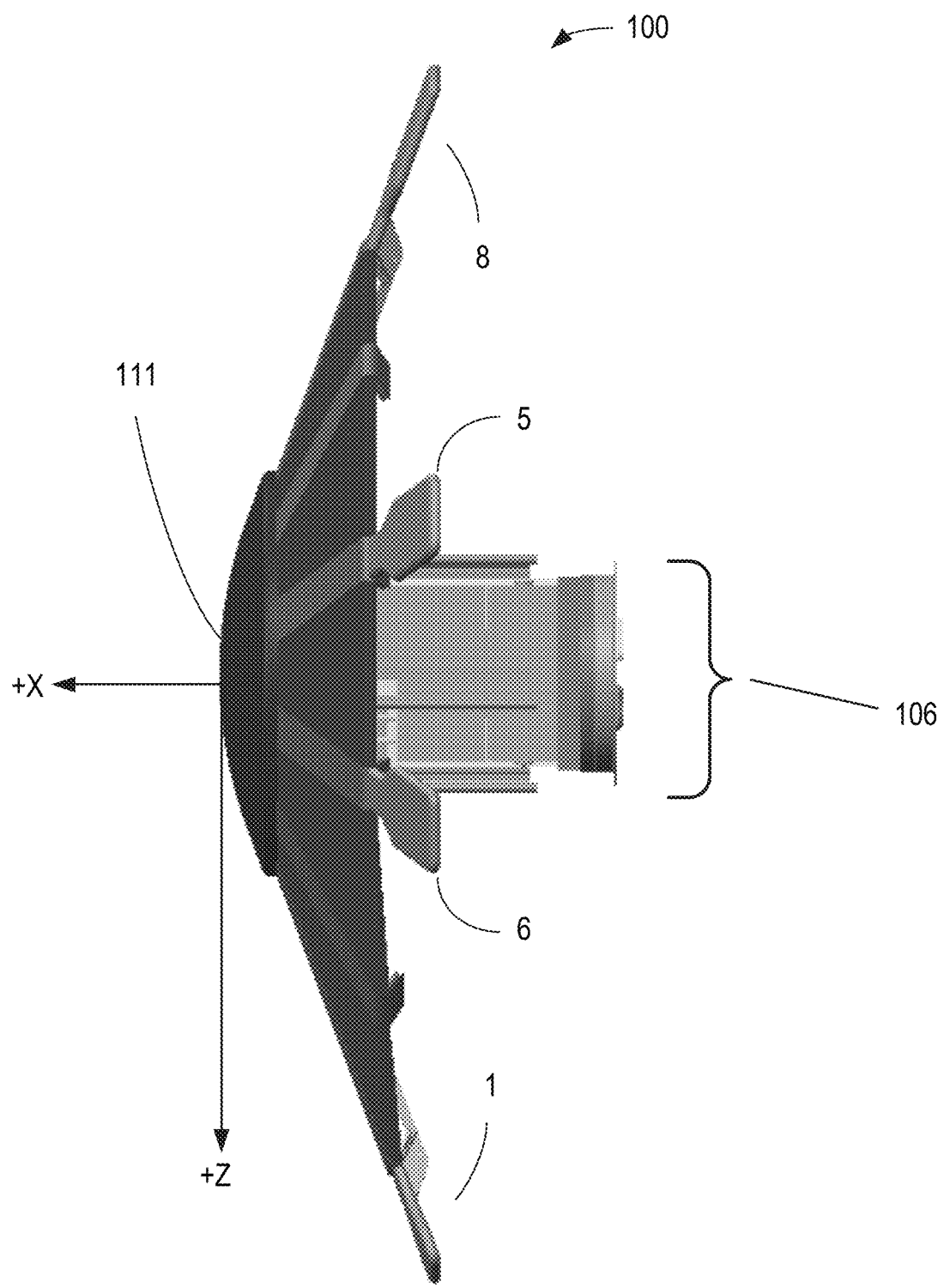
FIG. 3 is an illustration of a side view of an example of a deployable entry vehicle with a flap-based non-propulsive control system, according to some embodiments.

FIG. 2 is an illustration of a windward view of an example of a deployable entry vehicle with a flap-based non-propulsive control system, according to some embodiments. The asymmetry of the base vehicle of LNA vehicles 100, 200, and 300 is clearly shown here, with the varying length of twelve ribs, especially with longer trailing edge 103 ribs holding flaps 1, 2, and the middle length of adjacent transitional ribs. In a body reference frame coordinate system, longitudinal flaps 1, 2, 7, 8 are approximately oriented along the +/−Z-axis, while lateral flaps 3, 4, 5, 6 are approximately oriented along the +/−Y-axis of the vehicle's body. FIG. 3 shows a side view of LNA vehicle 100, which shows a +/−X-axis through the geometric center of volume 106 for combined vehicle and payload subsystems, through the apex of nose cap 111.

Figure 4A:
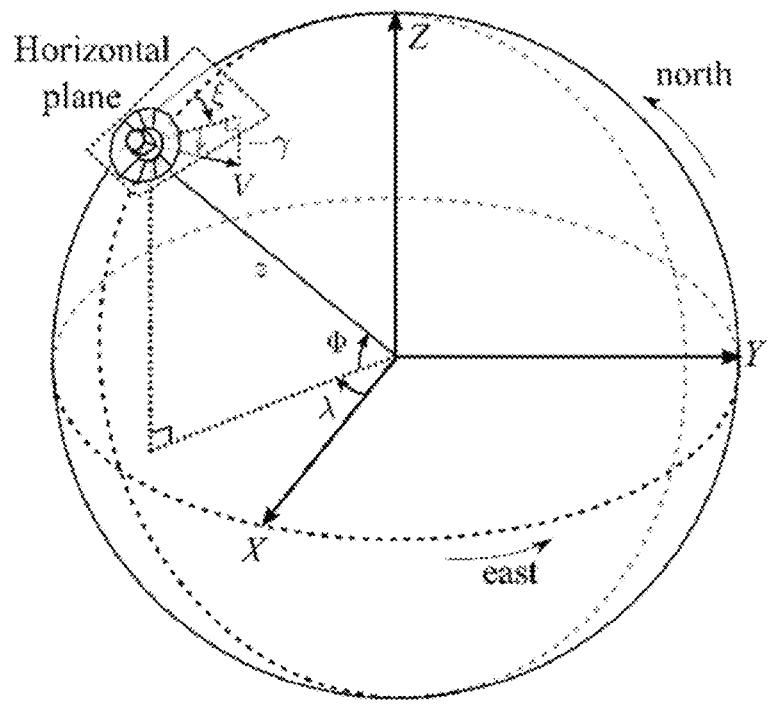
FIG. 4a is a diagram of positions of an entry vehicle relative to the planet center, according to some embodiments.
Figure 4B:
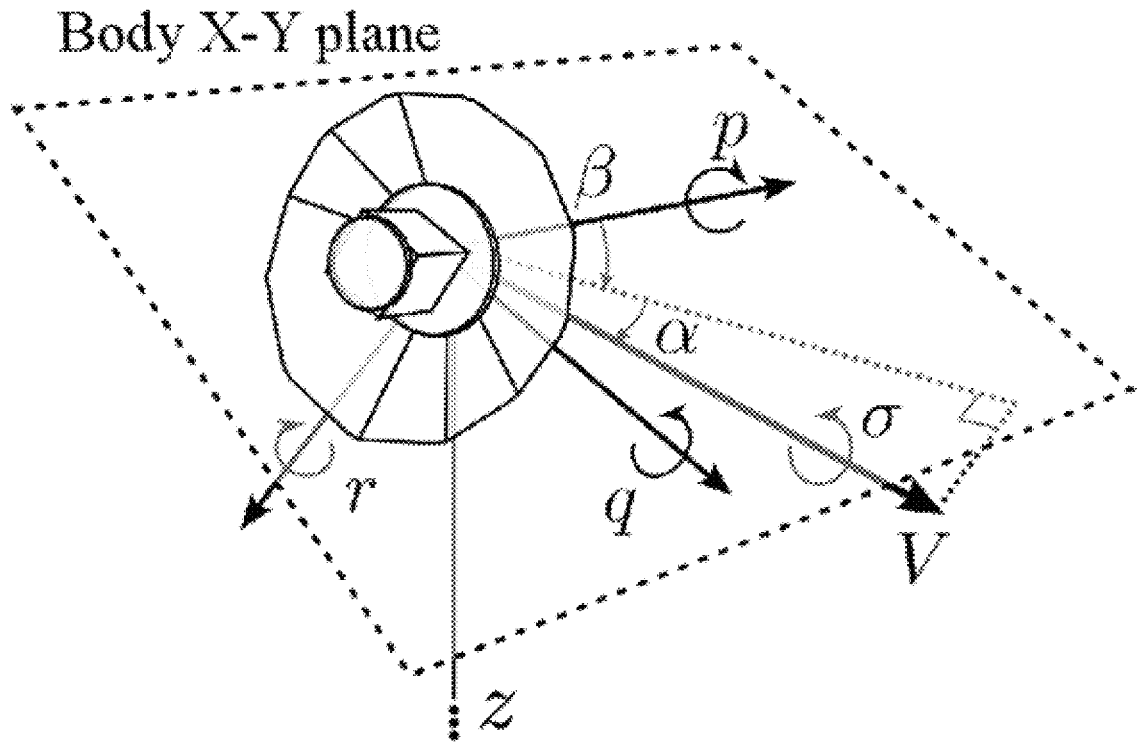
FIG. 4b is a diagram of orientation of a vehicle relative to the velocity vector V of the vehicle, according to some embodiments.
Figure 11:
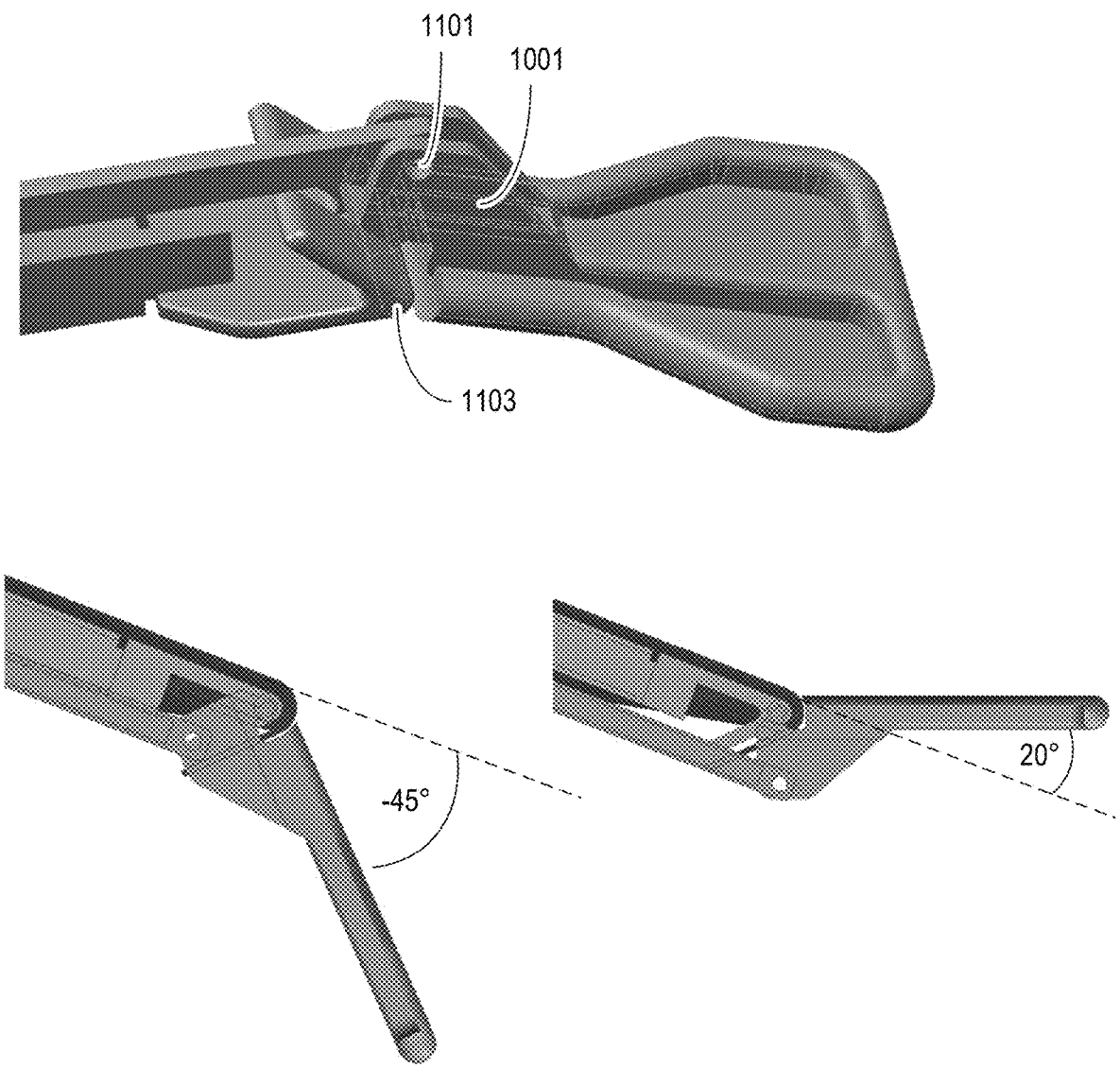
FIG. 11 is side perspective and side views of flaps at positive and negative deflection angles, according to some embodiments.

FIG. 4*a* is a diagram of positions of LNA vehicle 100 relative to a planet center, according to some embodiments. FIG. 4*b* is a diagram of orientation of LNA vehicle 100 relative to the velocity vector V of the vehicle, according to some embodiments. Variables used in the description herein are as follows, including variables used in FIGS. 4*a* and 4*b*:

α=angle of attack
β=sideslip angle
δ=flap deflection angle
γ=flight path angle
σ=bank angle
ψ, θ, φ=3-2-1 Euler angles (yaw, pitch, roll)
CoM=center of mass
$C_L$=lift coefficient
$C_D$=drag coefficient
$C_S$=side force coefficient
$C_L$=rolling moment coefficient
$C_M$=pitching moment coefficient
$C_N$=yawing moment coefficient
$C_P$=pressure coefficient
$I_{xx}$=moment of inertia with respect to the x-axis
$I_{zz}$=moment of inertia with respect to the z-axis
L=lift force
$\mathcal{L}, \mathcal{M}, \mathcal{N}$=body moments (roll, pitch, yaw)
p,q,r=inertial angular velocities for roll, pitch, yaw
LE=leading edge
$M_a$=Mach number
TE=trailing edge
$\bar{q}$=dynamic pressure Flap Control Authority With reference to FIGS. 1*a*, 2, and 3, deflection of flaps 1 to 8 are able to provide flap control authority to LNA vehicle 100, as shown in the aerodynamic moments found for the flaps. Specifically, a subset of these aerodynamic moments are presented at the trim angle of attack and sideslip and the same Mach number and dynamic pressure points shown for the base aeroshell. To determine the aerodynamic moments for the flaps, for a particular angle of attack, Mach number, sideslip angle, and dynamic pressure, the flaps are individually deflected from 20 degrees into the flow to −45 degrees out of the flow, as illustrated in FIG. 11. This process is repeated for different points within the Mach and dynamic pressure operating regime of the vehicle, while varying sideslip and angle of attack.

Since the vehicle is symmetric about the longitudinal x-z plane, only the tabs on one side of the vehicle are demonstrated for brevity. Results showed that deflecting the longitudinal control surfaces, flaps 7 and 2, into the flow generates primarily positive and negative pitching moments, respectively. These surfaces also generate secondary yaw moments as expected, when deflected individually into the flow and without their longitudinal counterparts on the other side of the vehicle, flaps 8 and 1. Furthermore, they generate roll moments of significantly smaller magnitudes than the pitch or yaw moments.

The lateral control surfaces, flaps 3 and 4, primarily induce yaw moments when deflected with secondary pitch moments generated. Flaps 3 and 4 can also create roll moments larger than their longitudinal counterparts 2 and 7, as expected. This induced roll is small in comparison to the primary yaw moments induced by deflecting the lateral tabs. Since the flap deflections are primarily in line with the roll axis of the vehicle, deflecting the tabs does not induce much roll except for the limited dihedral coupling that can also be seen in the base aeroshell.

Because the control surfaces can effectively induce pitch and yaw moments on LNA vehicle 100, deflection of flaps in the described configuration allows LNA vehicle 100 to track a guidance trajectory based on angle of attack using generated pitch moments and sideslip modulation using generated yaw moments. The strong dihedral coupling on the base aeroshell induced roll moments beyond the roll control authority of the flaps. This limits the magnitude of the sideslip for this guidance method and prompted the disclosed invention. Further, in addition to following guidance commands by modulating aerodynamic forces and moments, flaps can also be used to stabilize the vehicle during flight.

Mass Movement Control Authority

With reference to FIG. 1*b*, linear translation of masses 11 to 18 are able to provide control authority to LNA vehicle 200, as shown in the aerodynamic moments found when the center of gravity is changed. Specifically, a subset of these aerodynamic moments are presented at the trim angle of attack and sideslip, and the same Mach number and dynamic pressure points shown for the base aeroshell.

Since the vehicle is symmetric about the longitudinal x-z plane, only the masses on one side of the vehicle are demonstrated for brevity. Results showed that linearly translating the longitudinal masses, masses 17 and 12, into the flow generates primarily positive and negative pitching moments, respectively. These masses also generate secondary yaw moments as expected, when linearly translated across the rib, individually, without their longitudinal counterparts on the other side of the vehicle, masses 18 and 11. Furthermore, they generate roll moments of significantly smaller magnitudes than the pitch or yaw moments.

The lateral controls, masses 13 and 14, primarily induce yaw moments when deflected with secondary pitch moments generated. Masses 13 and 14 can also create roll moments larger than their longitudinal counterparts 12 and 17, as expected. This induced roll is small in comparison to the primary yaw moments induced by deflecting the lateral masses. Since the translated mass distances are primarily in line with the roll axis of the vehicle, translating the masses does not induce much roll except for the limited dihedral coupling that can also be seen in the base aeroshell.

In this particular vehicle 200 as shown, the lateral masses have a travel distance of +/−69 mm to provide a Center of Mass shift of +/−7 mm. Longitudinal masses 17 and 18 have a travel distance of +/−69 mm, while the longitudinal masses 11 and 12 have a travel distance of +/−112 mm, resulting in a longitudinal Center of Mass of +/−9 mm. The travel distances can be adapted to other vehicles' configurations as needed.

Because the masses can induce pitch and yaw moments on LNA vehicle 200, mass movement in the described configuration allows LNA vehicle 200 to track a guidance trajectory based on angle of attack using generated pitch moments and sideslip modulation using generated yaw moments. The strong dihedral coupling on the base aeroshell induced roll moments beyond the roll control authority of the flaps. This limits the magnitude of the sideslip for this guidance method and prompted the disclosed invention. Further, in addition using moving masses to follow guidance commands by modulating aerodynamic forces and moments, masses can be used to stabilize the vehicle during flight.

RCS Control

With reference to FIG. 1c, according to some embodiments, RCS thrusters are used to roll the asymmetric lifting vehicle to the desired bank angle and thus follow the desired trajectory by controlling the orientation of the vehicle's lift vector.

The four thrusters are mounted on the lateral ribs 23, 24, 25, 26, as shown in FIG. 1c. These thrusters cam fire in pairs and can independently generate 1 Newton thrust magnitudes. Additionally, each thruster provides a minimum pulse of 0.015 seconds and a total impulse of 5240 Newton*seconds for a Hydrazine propellant The thrusters are designed to provide roll control to change the vehicle's orientation and track bank angle guidance commands. Acting as opposing pairs, firing a pair of thrusters located on one side of the x-z plane will roll the vehicle in one direction and change the bank angle while firing the opposite thruster pair rolls the vehicle in the other direction and generates a bank reversal.

Control System Overview

Embodiments of the invention are directed towards software that executes upon physical hardware. The software of an embodiment is collectively referred to as flightpath control software. Flightpath control software of an embodiment may be composed of any number of functional components, or modules, which each perform one or more functions discussed herein. Embodiments may be implemented as a singular unit of software or a collection of modules designed to operate together as a functional whole.

In an embodiment, flightpath control software may include one or more guidance components, controller components and flight hardware control components.

In some embodiments, the guidance component is directed towards generating guidance commands that control the longitudinal forces for modulating angle of attack ($\alpha$) and lateral forces for modulating sideslip angle ($\beta$) in an uncoupled manner. In some embodiments, the guidance component is directed towards generating guidance commands for controlling the bank angle $\sigma$ of the vehicle. In some embodiments, the guidance component generates a commanded angle of attack $\alpha_c$, a commanded sideslip angle $\beta_c$, and a commanded bank angle $\sigma_c$, that are received and achieved by the controller component.

Dual controller components are directed towards monitoring the output of the dynamics in the state of movement of the vehicle from vehicle sensor systems, which estimate or determine the vehicle's state values, such as p, q, r, $\alpha$, $\beta$, and $\sigma$. One of the controller components is an inner loop controller component, which receives inertial angular velocities of roll (p), pitch (q), and yaw (r) expressed in a body-fixed coordinate system, and the vehicle's angle of attack ($\alpha$), sideslip angle ($\beta$) from the sensor system in an inner feedback loop. The inner loop controller component tracks the commanded angle of attack $\alpha_c$, received from the guidance component, and a commanded sideslip angle $\beta_c$ received from the other controller component, and compares them to the p, q, r, $\alpha$, and $\beta$ received from the system, and generates a control actuator action, such as flap deflection or mass movement, to the flightpath hardware control component that controls the actuators for the flightpath control hardware.

The second controller component is an outer loop controller component, which receives p, q, r, and the system's bank angle $\sigma$ from the system sensors in an outer feedback loop. The second controller component receives a commanded bank angle $\sigma_c$ from guidance component and, using the feedback of the system's current bank angle, commands the appropriate sideslip angle $\beta_c$ to the inner loop controller, which indirectly induces a roll moment through dihedral effect of the moving vehicle.

The flightpath hardware control component of an embodiment is directed towards receiving input from the controller component to control the system, applying the control input. For modeling in a simulation, the dynamics of the system can be expressed as a function of the controlled vehicle state and control input for the controller components.

Figure 5:
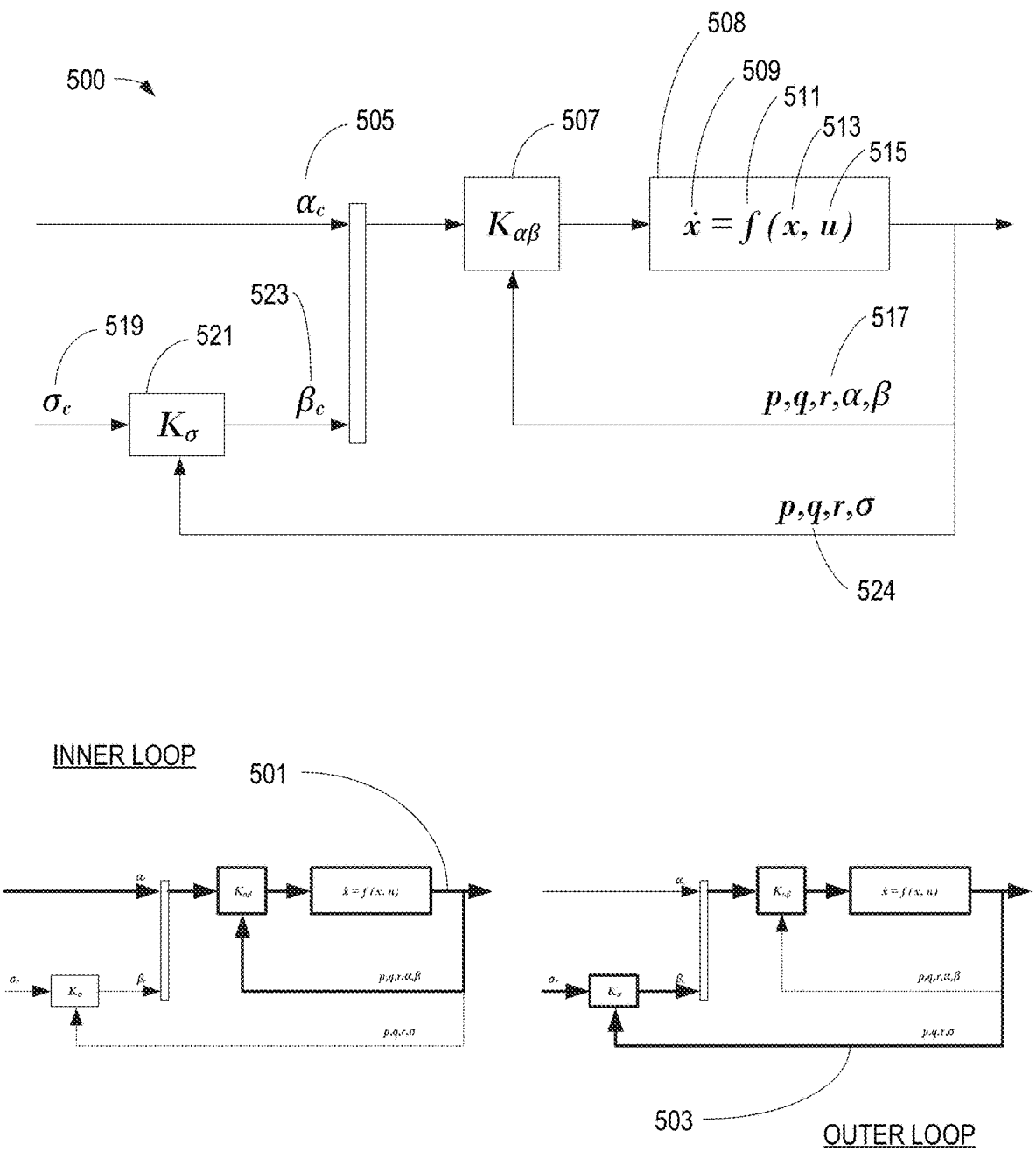
FIG. 5 is a diagram depicting a representation of a closed-loop system to exploit the dihedral effect to control the bank angle of the vehicle by modulating sideslip angle, according to some embodiments.

FIG. 5 is a diagram depicting a representation of a closed-loop system to exploit the dihedral effect to control the bank angle of the vehicle by modulating sideslip angle, according to some embodiments. The core concept of the dual inner-and-outer control loops is to exploit the aerodynamic properties of the main vehicle body of having a dihedral effect that induces roll from sideslip to control the bank angle. Since the aerodynamic forces acting on the body are large, exploiting these forces for control should enable faster bank accelerations than could be practically achieved through typical control strategies. This also enables vehicle designs with fewer control actuators, since roll-specific actuators are not required to regulate bank angle.

Previous typical control strategies rely on the attitude of the vehicle being fully actuated or over-actuated to regulate roll, pitch, and yaw. For example, standard piloted aircraft with control surfaces have aileron(s) to control roll, rudder(s) and vertical stabilizer(s) to control yaw, and elevator(s) to control pitch. There is typically coupling in the different channels, such as in the lateral channel with the aileron and rudder to turn and yaw the vehicle. This aerodynamic coupling, in addition to the kinematic coupling that can exist in certain flight conditions and variability in control surface effectiveness, is generally undesirable and results in limited maneuverability. On the other hand, intentionally and strategically coupling yaw and roll can be used to achieve enhanced maneuverability.

With reference to FIG. 5, closed-loop control system 500 can exploit the dihedral effect to control the bank angle of the vehicle by modulating sideslip by inducing yaw moments. In this approach, control system 500 includes an inner loop 501 and an outer loop 503. In inner loop 501, control actuators 515 that primarily induce pitch and yaw moments are used to follow angle of attack commands 505 from the guidance component, including regulation about a constant angle of attack command 505 and an angle of sideslip command 523 from outer control loop 503. Outer control loop 503 responds to bank angle commands 519 from the guidance component by commanding a sideslip angle 523, which induces a roll moment through the dihedral effect to achieve the commanded bank angle 519. Note that inner loop 501 does not need to regulate angle of attack $\alpha_c$ if the system design does not require it, such as for a longitudinally stable entry vehicle.

According to some embodiments, a process is executed by the system to control the flightpath of LNA vehicle 100. For a particular entry state, including target location, entry flight path angle (FPA) envelope based on aerodynamic loading and heat rate to avoid the vehicle from skipping out or burning up, respectively, the guidance component commands an angle of attack $\alpha_c$ and a bank angle $\sigma_c$. The angle of attack command $\alpha_c$ is received by inner-loop controller 507, which compares the commanded angle of attack $\alpha_c$ with the system feedback 517 p, q, r, $\alpha$, and $\beta$, and generates a control input u 515, which leads to control actuator action in the vehicle, such as flap deflection to induce pitch and yaw moments. The dynamics ẋ of the state of the vehicle which depends on the controlled vehicle state a and control input u, and measurements of state components produce values 517 for p, q, r, α, and β as feedback for inner-loop controller 507.

Inner-loop controller component 508 also receives input from outer loop controller component 521 in the form of a commanded sideslip angle $β_c$ 523. In this process, the guidance component commands an angle of attack $α_c$ and a bank angle $σ_c$. The bank angle command $σ_c$ is received by the outer-loop controller 521, which compares the commanded bank angle $σ_c$ with system feedback 524 p, q, r, σ from the state component system 508, and generates sideslip angle command $β_c$ 523 for inner-loop controller 507 to adjust sideslip, which can be used to exploit the dihedral effect in the vehicle to induce the necessary change in bank angle σ.

Flap Control Mechanisms and Integration

Figure 6:
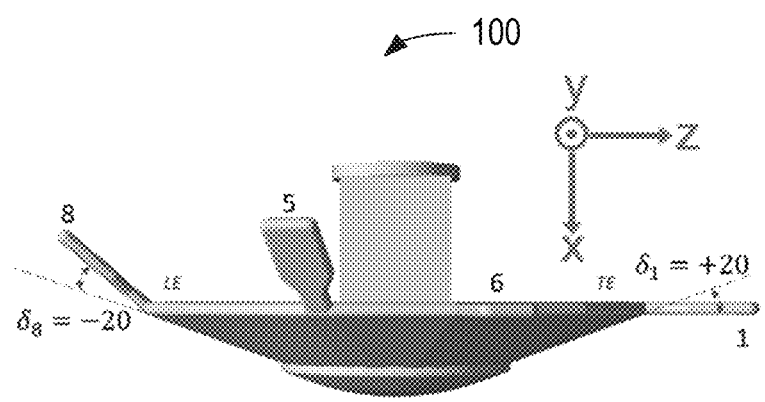
FIG. 6 is a diagram showing the flap deflection angles ranges and configuration on a deployable entry vehicle with a flap-based non-propulsive control system, according to some embodiments.

FIG. 6 is a diagram showing the flap deflection angles ranges and configuration on a deployable entry vehicle with a flap-based non-propulsive control system, according to some embodiments. As shown, the leading edge flap 8 is deflected aft as a −20° deflection out of the flow, and the trailing edge flap 1 is deflected windward as a 20° deflection into the flow, according to some embodiments. In some embodiments, the leading edge flap 8 is deflected aft up to as a −45° deflection out of the flow. In nominal flight, all flaps can be configured to deflect −45° out of the flow. For notional maximum lift, trailing edge flaps 1, 2 are deflected 20° deflection into the flow, while the other tabs are deflected −45° out of the flow. When stowed, tab angles are set to 0° to be in line with the ribs.

Figure 7:
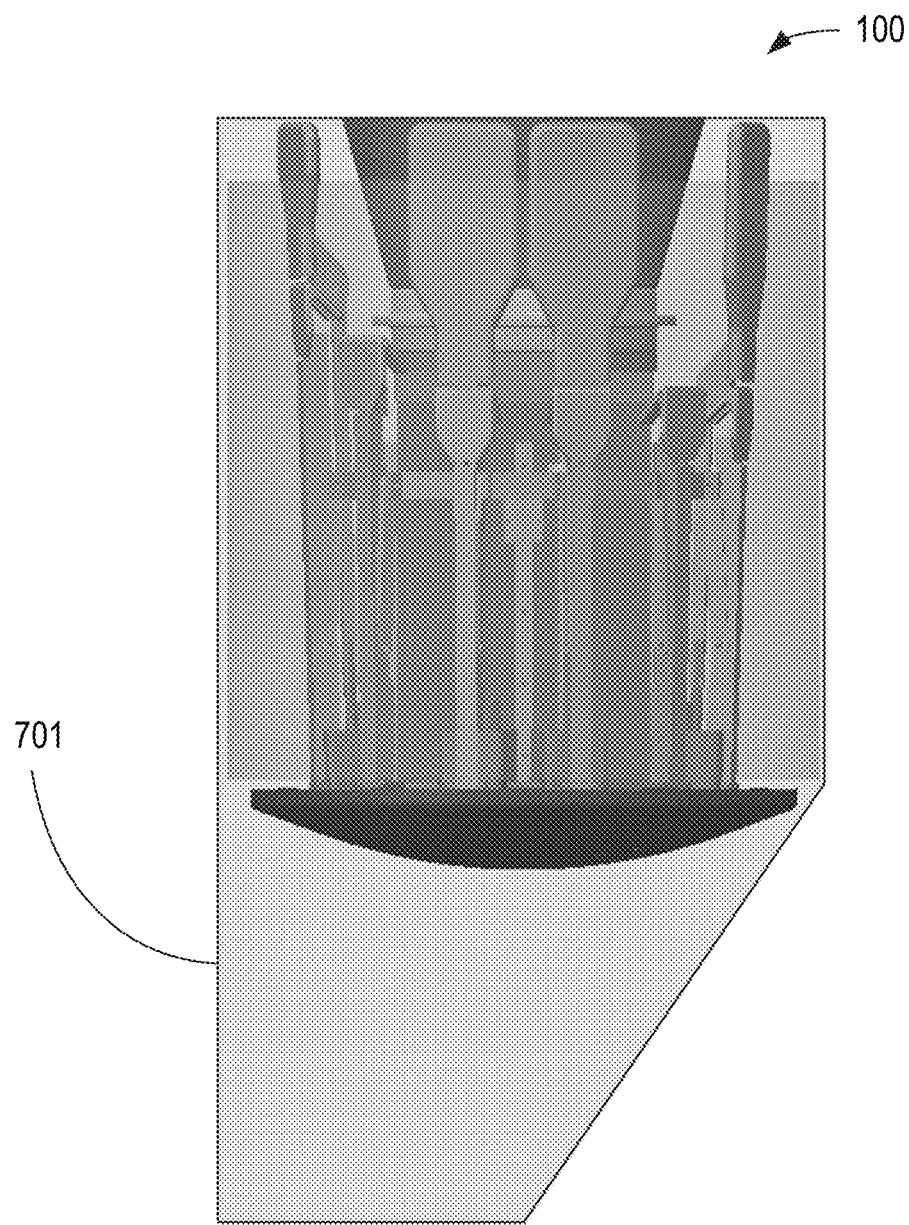
FIG. 7 is a diagram showing a stowing configuration for a deployable entry vehicle with a flap-based non-propulsive control system, with fabric not shown, and overlaid with a small satellite payload envelope volume in the Aft Bulkhead Carrier (ABC) system of a Centaur Upper Stage, according to some embodiments.

FIG. 7 is a diagram showing a stowing configuration for LNA entry vehicle 100, with fabric not shown, and overlaid with a small satellite payload envelope volume 701 in the Aft Bulkhead Carrier (ABC) system of a Centaur Upper Stage, according to some embodiments. In some embodiments, LNA Vehicle 100 is configured to fit into the secondary payload space in the ABC system for a Centaur Upper Stage. Details on ABC system can be found in Burdis, G., *The Atlas V Aft Bulkhead Carrier—Requirements for the Small Satellite Design*, 24th Annual AIAA/USU Conference on Small Satellites, 2010, incorporated by reference herein. In embodiments of the invention using the base LNA entry vehicle, the sizing constraints of secondary payload space of the ABC system creates a limit for the maximum size of adjacent flaps. The payload space and the rib length also places constraints on the maximum flap length. However, one of ordinary skill in the art will understand that the scope of the invention is not limited to the ABC system constraints, and appropriate dimensions for the flaps can be used in other vehicle configurations.

Figure 8:
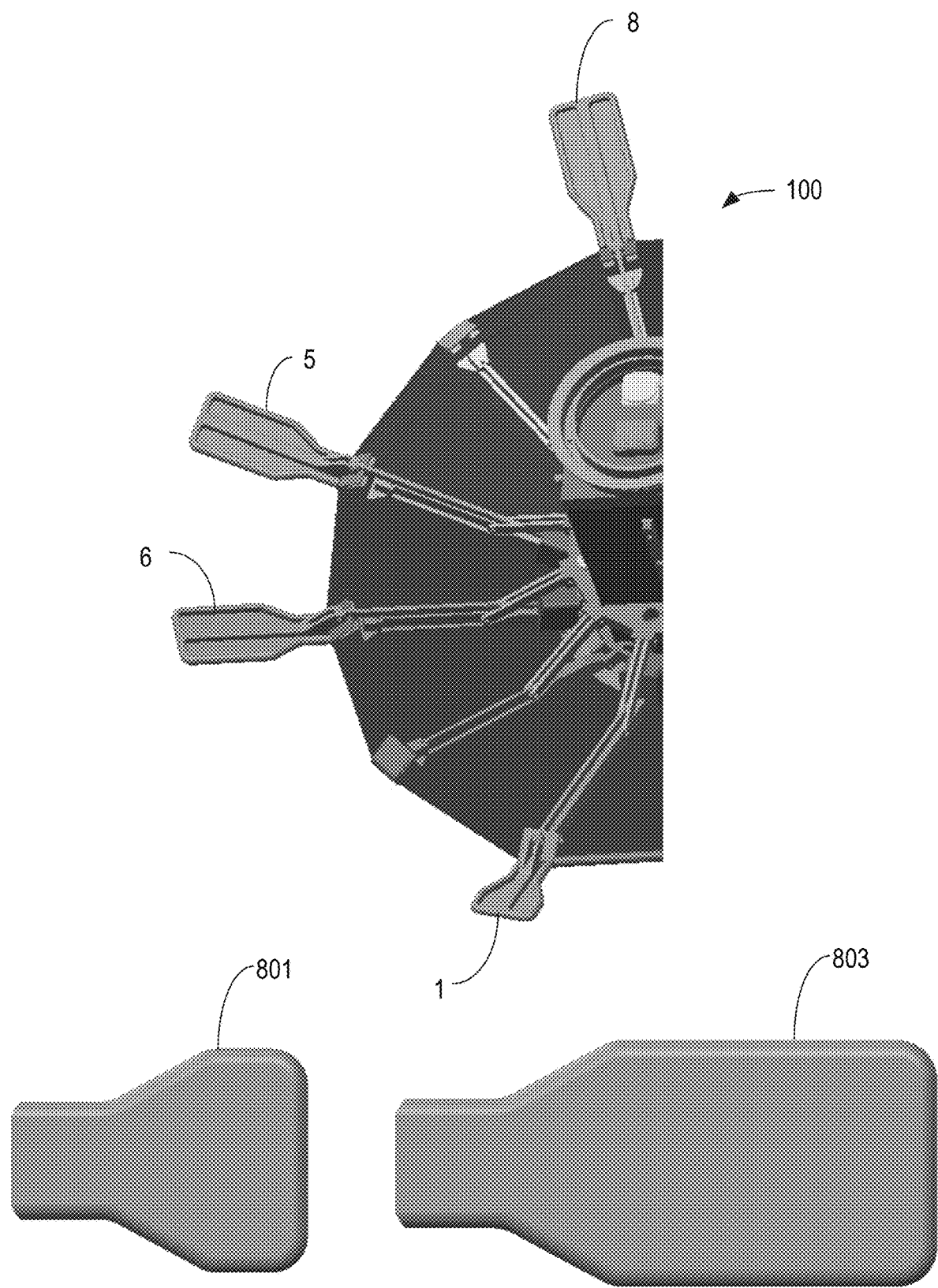
FIG. 8 is a diagram showing varying sizes of flap configuration for a deployable entry vehicle with a flap-based non-propulsive control system, as well as a windward view of flaps, according to some embodiments.

FIG. 8 is a diagram showing varying sizes of flap configuration for LNA entry vehicle 100, as well as a windward view of flaps, according to some embodiments. As shown, flap 1 is configured with a short tab 801 that is used with a longer rib on the trailing edge 103 of LNA entry vehicle 100. Flap 5 is configured with long tab 803 while they are mounted to shorter standard ribs on the leading edge. β flaps 5, 6 (β for indicating sideslip control) are also configured with long tab 803.

Figure 9:
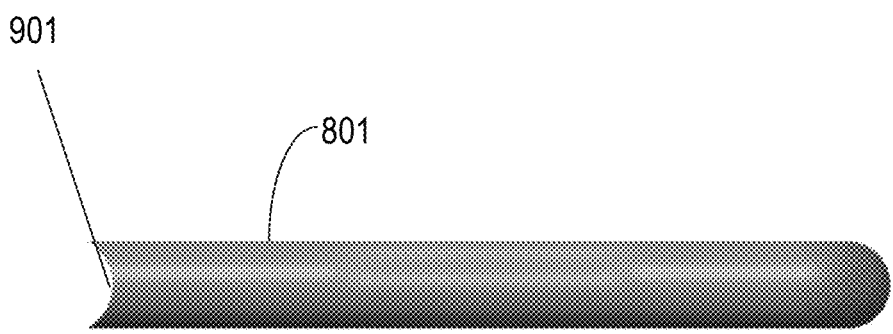
FIG. 9 is a side view of an example of a flap and a mounting configuration of a flap on a rib for a deployable entry vehicle with a flap-based non-propulsive control system, according to some embodiments.
Figure 9:
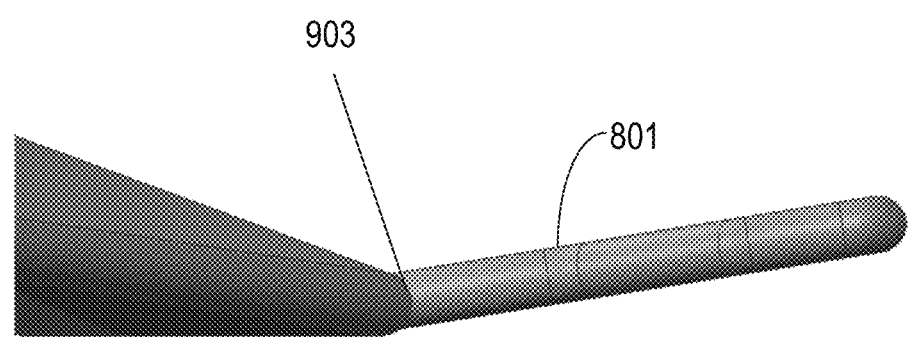

FIG. 9 is a side view of an example of a flap and a geometric configuration of a flap on a rib for a deployable entry vehicle with a flap-based non-propulsive control system, according to some embodiments. Tab 801, shown without the inner bracket and fastening mechanism, hinges about rib tip shoulder radius 903 to provide a smooth transition flow between the outer surface of the rib and the outer surface of the flap. The end 901 of the flap is contoured to nest with the rib tip shoulder radius 903. In some embodiments, the outer surface of the flap is tangential to the curve of the rib tip shoulder radius 903 in negative deflections out of the flow.

Figure 10:
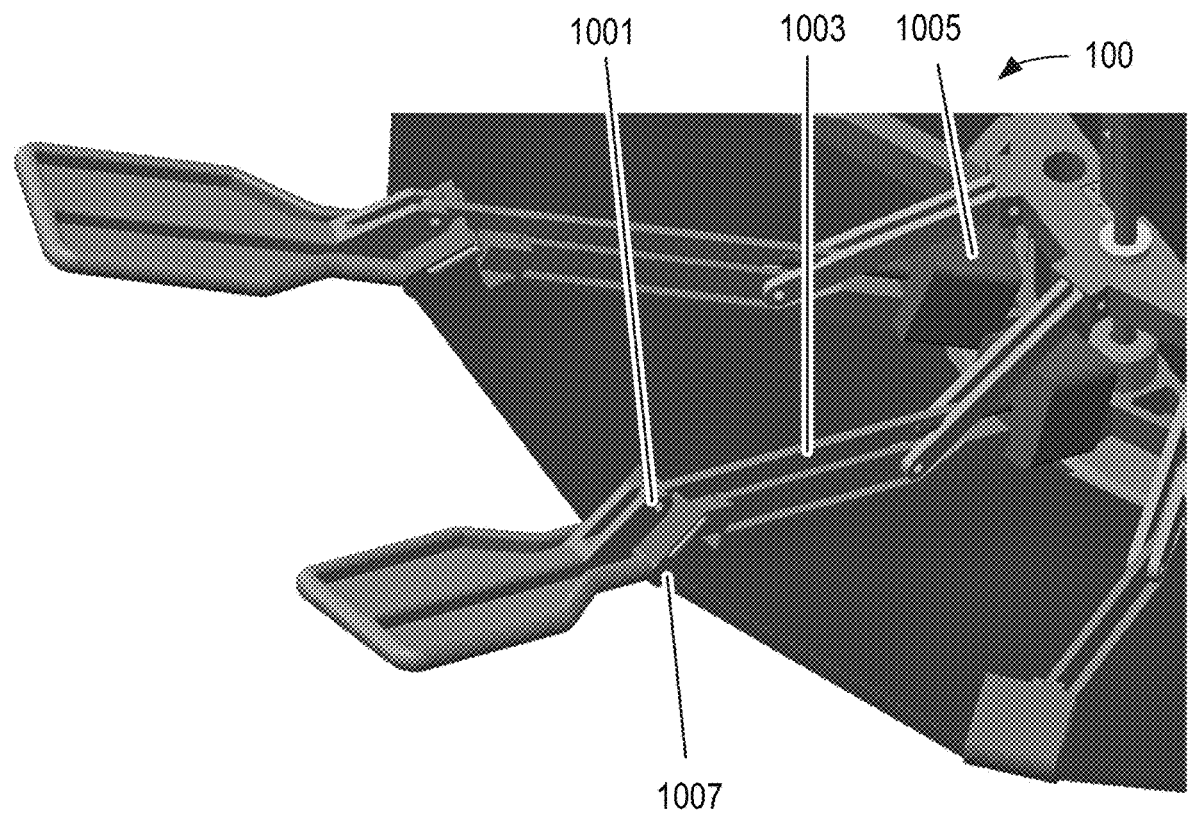
FIG. 10 is an aft perspective view of flaps, a mounting configuration for flaps, and an actuation configuration for flaps for a deployable entry vehicle with a flap-based non-propulsive control system, according to some embodiments.
Figure 10:
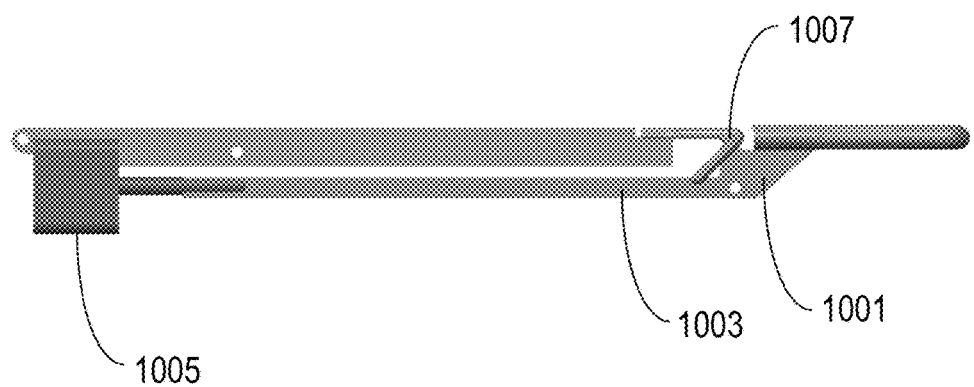

FIGS. 10 and 11 illustrate aft perspective views of flaps, showing a mounting configuration for flaps, and an actuation configuration for flaps for a deployable entry vehicle with a flap-based non-propulsive control system, according to some embodiments. In some embodiments, tab actuation assembly includes a linear actuator 1005 that extends or retracts connecting linkage rod 1003. Connecting linkage rod 1003 is fastened to a crank bracket structure 1001 of the flap by a linkage pin 1101, which passes through both an inner portion of the bracket structure and the connecting linkage rod to form a crank hinge. The bracket structure 1001 extends beyond flap end 901 and includes a connecting barrel. A hinge pin 1103 passes through rib tip hinging hole and connecting barrel to form a hinge point 1007 for the flap. FIG. 11 further illustrates the deflection range of the flaps, showing a −45° out of the flow and a 20° deflection into the flow.

Mass Movement Control Mechanisms and Integration

With further reference to FIG. 1b, mass movement non-propulsive control system uses sliding mass blocks, such as masses 15 and 16, along the aeroshell ribs to shift the vehicle center-of-mass (CoM) and change the angle of attack of the vehicle. Due to the rib layout, it is necessary to group the masses in pairs in order to maintain symmetry and stability about the vehicle's pitch and yaw axes. In order to maximize the available control forces, mass movement control system uses eight moving mass blocks, according to some embodiments.

The layout included Tungsten mass blocks to be driven along the extended portions of the ribs. The shape and form factor of the mass blocks maximize mass travel distance while still fitting within the packaging constraints associated with the stowable/deployable structure.

The design uses an actuator layout that is very similar to flap control system, with motors 205 mounted to the innermost part of the eight ribs supporting the moving masses. Lead screws 203 driven by the motors provide the linear motion of the masses. The rib structure can double as the linear slide/guides for the mass blocks. Internal control components such as motor drives and batteries were identical to the flap control system.

Reaction Control System Mechanisms and Integration

With further reference to FIG. 1c, the RCS thrusters are located outboard on the aeroshell structure for increased roll torque and employs a Hydrazine Propellant system with a larger propellant tank to provide the necessary total impulse.

Thus, four 1.0 Newton thrusters were mounted on the back side of the lateral facing ribs. Thruster nozzles were located 0.4 m from the vehicle central axis in order to provide the desired amount of roll torque. Some minor modifications to the rib design and deployment system are required to accommodate the rib mounted thrusters, and implementation of hinged propellant lines are expected. Payload enclosure packaging of the propellant tank, controller and batteries feasibly fit within the available payload volume.

Implementing Mechanisms for Components

Figure 12:
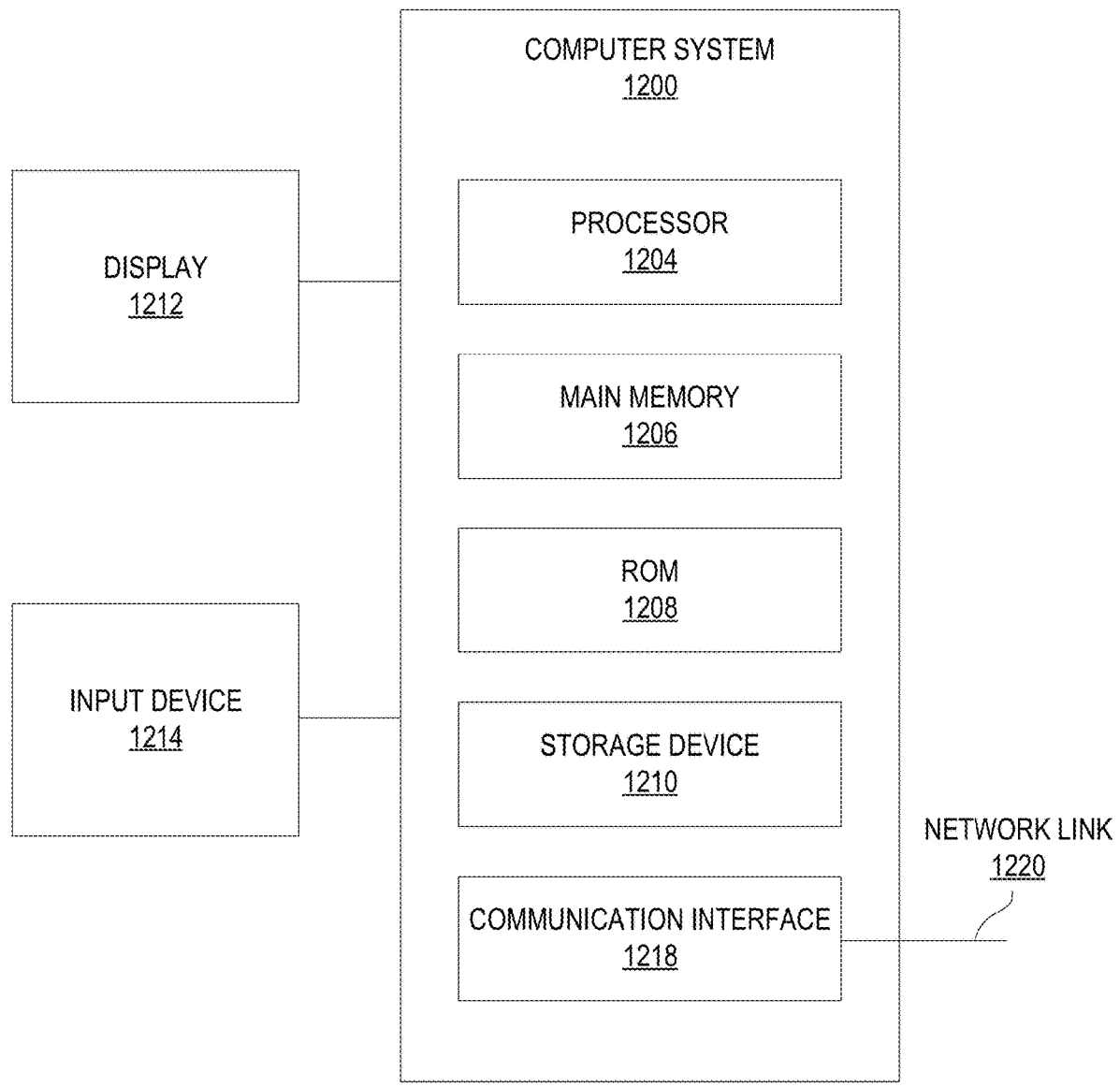
FIG. 12 is a block diagram that illustrates a computer system upon which software performing one or more of the steps or functions discussed herein may be implemented.

FIG. 12 is a block diagram that illustrates a computer system 1200 upon which software performing one or more of the steps or functions discussed herein may be implemented. The computer system 1200 shown in FIG. 12 may be commercial-off-the-shelf (COTS) computer system or special purpose hardware.

In an embodiment, computer system 1200 includes processor 1204, main memory 1206, ROM 1208, storage device 1210, and communication interface 1218. Computer system 1200 includes at least one processor 1204 for processing information. Computer system 1200 also includes a main memory 1206, such as a random-access memory (RAM) or other dynamic storage device, for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device for storing static information and instructions for processor 1204. A storage device 1210, such as a magnetic disk or optical disk, is provided for storing information and instructions.

Embodiments of the invention may perform any of the actions described herein by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any non-transitory tangible medium that participates in storing instructions which may be provided to processor 1204 for execution. Note that transitory signals are not included within the scope of a non-transitory computer-readable storage medium. A non-transitory computer-readable storage medium may take many forms, including but not limited to, non-volatile media and volatile media. Non-volatile media includes, for example, optical or magnetic disks, such as storage device 1210. Volatile media includes dynamic memory, such as main memory 1206. Non-limiting, illustrative examples of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a network link 1220 to computer system 1200.

Communication interface 1218 provides a two-way data communication coupling to a network link 1220 that is connected to a local network. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through a local network to a host computer or to data equipment operated by an Internet Service Provider (ISP).

Computer system 1200 can send messages and receive data, including program code, through the network(s), network link 1220 and communication interface 1218. For example, a server might transmit a requested code for an application program through the Internet, a local ISP, a local network, subsequently to communication interface 1218. The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A system for controlling a flightpath of a flight vehicle, comprising:
   a guidance component configured to provide an angle-of-attack command to an inner loop controller component, and a bank-angle command to an outer loop controller component;
   the inner loop controller component configured to receive first feedback on the flight vehicle's current state, said first feedback including angular velocities about roll, pitch and yaw axes, and angle of attack and sideslip angle of the flight vehicle;
   the outer loop controller component configured to receive second feedback on the flight vehicle's current state, said second feedback including angular velocities about roll, pitch and yaw axes, and bank angle of the flight vehicle;
   wherein:
      the outer loop controller component uses the second feedback, in conjunction with the bank-angle command, to produce a sideslip angle command to provide to the inner loop controller,
      the inner loop controller component uses the first feedback, in conjunction with the sideslip angle command, to produce a control input to a flightpath hardware control component, and
      the flightpath hardware control component commands changes to position of one or more flightpath control hardware to induce yaw moments to change current sideslip angle of the vehicle.

2. The system of claim 1, wherein inducing yaw moment further induces a roll moment for that changes current bank angle of the vehicle.

3. The system of claim 1, wherein the inner loop component further uses the angle-of-attack command to produce the control input for inducing pitch moment that changes current angle-of-attack of the vehicle.

4. The system of claim 1, wherein the flightpath control hardware include a plurality of flaps hinged at the end one or more ribs of the vehicle.

5. The system of claim 4, wherein a leading pair the plurality of flaps are positioned approximately at a leading edge of the vehicle.

6. The system of claim 4, wherein a trailing pair the plurality of flaps are positioned approximately at a trailing edge of the vehicle.

7. The system of claim 4, wherein a leading pair the plurality of flaps are positioned approximately at a leading edge of the vehicle, wherein a trailing pair the plurality of flaps are positioned approximately at a trailing edge of the vehicle, and the leading pair has a longer length than the trailing pair.

8. The system of claim 4, wherein flaps of the plurality of flaps are positioned in longitudinal positions to induce changes in the angle of attack of the vehicle when deflected.

9. The system of claim 4, wherein flaps of the plurality of flaps are positioned in lateral positions to induce changes in the sideslip angle of the vehicle when deflected.

10. The system of claim 1, wherein the flightpath control hardware includes a plurality of masses positioned to move along one or more ribs of the vehicle.

11. The system of claim 10, wherein a leading pair of the plurality of masses are positioned on the leading edge ribs of the vehicle.

12. The system of claim 10, wherein a trailing pair of the plurality of masses are positioned on the trailing edge ribs of the vehicle.

13. The system of claim 10, wherein masses of the plurality of flaps are positioned in longitudinal positions to induce changes in the angle of attack of the vehicle when moved along the ribs.

14. The system of claim 10, wherein masses of the plurality of flaps are positioned in lateral positions to induce changes in the sideslip angle of the vehicle when moved along the ribs.

15. The system of claim 1, wherein flightpath hardware control component commands one or more thrusters positioned on one or more ribs of the vehicle to fire to induce a rolling movement in the vehicle.

16. The system of claim 15, wherein a pair of thrusters are installed on lateral ribs on both a port side and a starboard side of the vehicle.

17. The system of claim 4, wherein a flap's outer control surface is configured to be tangential to the rib tip radius contour when deflected at an out-of-the-flow angle.

* * * * *